(12) United States Patent
Xie et al.

(10) Patent No.: US 8,326,311 B1
(45) Date of Patent: *Dec. 4, 2012

(54) RESOURCE ALLOCATION THROUGH BOUNCING-BUSY HOUR TRAFFIC MODELING

(75) Inventors: Feng Xie, Leawood, KS (US); Syed Ubaid Ahmed, Overland Park, KS (US); Jorge Toledo Climaco, Overland Park, KS (US); Stephen R. Bales, Lee's Summit, MO (US); Cheryl Nichols, Raymore, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/303,910

(22) Filed: Nov. 23, 2011

Related U.S. Application Data

(63) Continuation of application No. 12/357,000, filed on Jan. 21, 2009, now Pat. No. 8,073,455.

(51) Int. Cl.
*H04W 72/00* (2009.01)

(52) U.S. Cl. ............... 455/452.1; 455/453; 455/423; 455/561; 370/329

(58) Field of Classification Search ............ 455/450, 455/451, 452.1, 452.2, 453, 422.1, 423, 424, 455/446; 370/329
See application file for complete search history.

(56) References Cited

U.S. PATENT DOCUMENTS 6,584,084 B1 * 6/2003 Barany et al. ............... 370/329
6,801,776 B2 * 10/2004 Notanii et al. ............. 455/451

* cited by examiner

*Primary Examiner* — Vladimir Magloire

(57) ABSTRACT

Method for determining one or more sectors requiring additional communications resources in a network divided into a plurality of sectors. Usage data is determined within each sector. The sectors are divided into a number of groups based on the usage data for each sector. An ordering of sectors in each group is created, based on average usage data of the sectors. One or more sectors requiring additional communication resources are determined based on the ordering of sectors in each group, and the allocation of additional communications resources is facilitated consistent with the ordering.

18 Claims, 12 Drawing Sheets

RESOURCE ALLOCATION THROUGH BOUNCING-BUSY HOUR TRAFFIC MODELING

CROSS-REFERENCE TO RELATED APPLICATIONS

This application is a continuation of U.S. patent application Ser. No. 12/357,000 filed Jan. 21, 2009, entitled "RESOURCE ALLOCATION THROUGH BOUNCING-BUSY HOUR TRAFFIC MODELING, the entirety of which is incorporated by reference herein.

INTRODUCTION

As larger numbers of computing devices with wireless networking capabilities attempt to connect to basestations providing wireless network access points, these basestations can become overloaded, causing some computing devices to be denied service, or to have low quality service. Communication resources could be added to basestations in high demand areas to provide additional resources for computing devices with wireless networking technologies.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first aspect, a method is provided for determining one or more sectors requiring additional communications resources in a network divided into a plurality of sectors. Usage data is determined within each sector. The sectors are divided into a number of groups based on the usage data for each sector. An ordering of sectors in each group is created, based on average usage data of the sectors. One or more sectors requiring additional communication resources are determined based on the ordering of sectors in each group, and the allocation of additional communications resources is facilitated consistent with the ordering.

In a second aspect, a method is provided for generating a report containing an ordering of a plurality of sectors in a network divided into sectors. Usage data is determined within each sector. The plurality of sectors is divided into three groups based on the usage data for each sector. An ordering of sectors is created in each of the three groups, based on the usage data, by utilizing a different ordering algorithm from a set of ordering algorithms for each of the three groups. A report is generated containing the ordering of sectors in each of the three groups.

In a third aspect, a method is provided for determining one or more sectors requiring additional communications resources in a network divided into a plurality of sectors. Usage data within each sector is determined. The plurality of sectors is divided into a high-cluster group, a medium-cluster group, and a low-cluster group, based on the usage data for each sector. An ordering of sectors is created in each of the groups, based on the usage data, by utilizing a first ordering algorithm for the high-cluster group, a second ordering algorithm for the medium-cluster group, and a third ordering algorithm for the low-cluster group. One or more sectors are determined requiring additional communications resources based on the ordering of sectors in each group.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
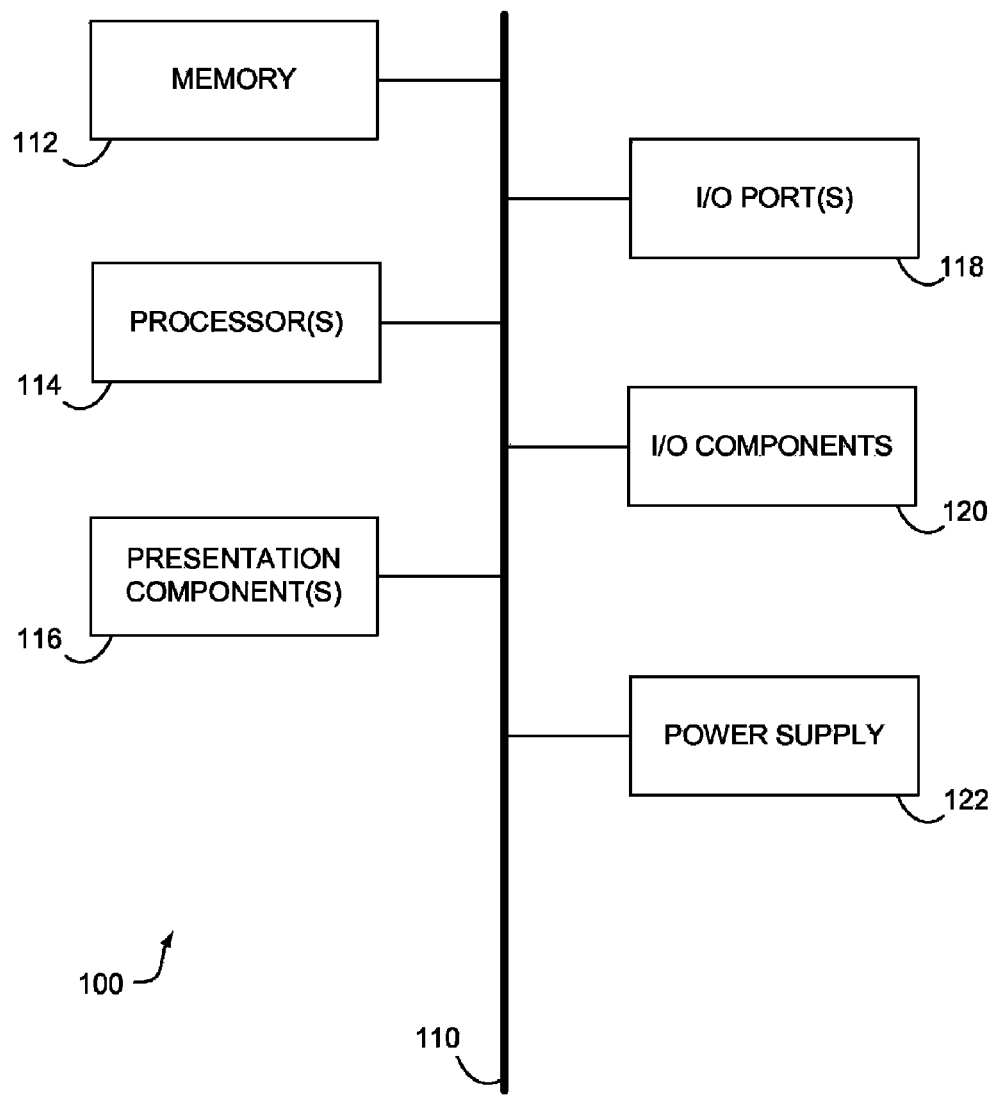
FIG. 1 depicts a block diagram of an exemplary computing environment suitable for implementing an embodiment of the invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to determining one or more sectors in a network divided into a plurality of sectors requiring additional communications resources. Large-scale, wide-area networks are often composed of multiple basestations, each basestation capable of supporting some number of mobile computing devices. Examples of basestations suitable for the creation of wide-area networks include cellular towers. Sectors in the network can be defined by the coverage area of these individual basestations or according to clusters of basestations. Each basestation may have the ability to support multiple mobile computing devices.

As a sector becomes saturated with mobile computing devices requiring communication resources, additional communication hardware can be added to each basestation to increase their individual capacities, thereby increasing the overall available resources. Additionally, in sectors with very high demand, a new basestation could be added to further add network resources, allowing a larger number of devices to have appropriate service levels.

Resource demands made in sectors in the network can be characterized by determining usage data within each sector. According to an embodiment of the invention, usage can be measured by a number of different metrics. By way of example, an Erlang is a one continuous hour of use and can be used as a metric to measure resource usage. As another example, usage could be characterized by the total minutes of use over a particular period.

By characterizing the resource demands in each sector of a network, new communications resources can be intelligently placed, improving service in areas with too many mobile computing devices requesting network services. According to an embodiment of the invention, sectors can be divided into groups based on overall resource demand. By way of example, sectors could be placed into groups based on the total number of monthly Erlangs in each sector. The group with the sectors with the most Erlangs could be aggressively given new resources.

According to embodiments of the invention, characterizing the resource usage of a sector can use one or more models to model the average usage within that sector. Different models will characterize the average usage in different ways. For example, some models will tend to be conservative in estimating the average usage for a sector for a month. Other models will be more aggressive. A more conservative model for average usage can lead to communication resource being added to the sector later than a more aggressive model.

According to an embodiment of the invention, sectors are divided into groups based on total-monthly-usage measurements. The average usage of the sectors in the group containing the sectors with the highest, total-monthly usages can be determined by an aggressive model. The average usage of the sectors in the group of medium, total-monthly usages can be determined by a moderate model. The average usage of the sectors in the group of low, total-monthly usages can be determined by a conservative model. Once all of the sectors have average monthly usages modeled, an ordering can be developed, based on the average usages. By way of example, the sectors in the network could be ordered from highest, average usage to lowest, average usage. Communications resources could then be distributed in the network according to the ordering.

Each of the usage models can take raw usage data as input. According to an embodiment of the invention, the raw usage data can be collected by each basestation and correlated with sectors within the network. By way of example, the raw data could be in terms of Erlangs. As another example, the raw data could be in terms of minutes of use.

An embodiment of the invention is directed to determining one or more sectors requiring additional communication resources in a network divided into a number of sectors. A total-hourly, busy-time traffic is collected for each hour for one month of the plurality of sectors. A total-monthly, busy-time traffic is determined for each sector, as the sum of each total-hourly, busy-time traffic for each sector. The sectors are divided into a number of groups, based on the total-monthly, busy-time traffic for each sector. An ordering of sectors is created in each group, based on the total-hourly, busy-time traffic, utilizing a different ordering algorithm from a set of ordering algorithms for each group. One or more sectors requiring additional communication resources are determined, based on the ordering of sectors in each group.

Another embodiment of the invention is directed to generating a report containing a busy-time-based ordering of a number of sectors in a network divided into sectors. A total-hourly, busy-time traffic is collected for each hour for one month of the plurality of sectors. A total-monthly, busy-time traffic is determined for each sector, as the sum of each total-hourly, busy-time traffic for each sector. The sectors are divided into three groups, based on the total-monthly, busy-time traffic for each sector. An ordering of sectors is created in each group, based on the bouncing-busy-time data related to each day, utilizing a different ordering algorithm from a set of ordering algorithms for each group. A report containing the ordering of sectors is generated.

A further embodiment of the invention is directed to determining a number of sectors that require additional communication resources in a network divided into sectors. A total-hourly, busy-time traffic is collected for each hour for one month of the plurality of sectors. A total-monthly, busy-time traffic is determined for each sector, as the sum of each total-hourly, busy-time traffic for each sector. The sectors are divided into a high-cluster group, a medium-cluster group, and a low-cluster group, based on the total-monthly, busy-time traffic for each sector. An ordering of sectors is created by utilizing a first ordering algorithm for the high-cluster group, a second ordering algorithm for the medium-cluster group, and a third ordering algorithm for the low-cluster group.

The first ordering algorithm includes: determining a bouncing-busy hour for each day for each sector; selecting a top number of bouncing-busy hours for each sector; averaging the selected bouncing-busy hours for each sector; selecting bouncing-busy hours that are a threshold away from the average for each sector and removing them as outliers; re-averaging the remaining bouncing-busy hours in each sector; and creating an ordering based on the new averages.

The second ordering algorithm includes: dividing the total-hourly, busy-time traffic for each sector into seven groups according to days of the week; determining a bouncing-busy hour for each day for each of a plurality of sectors for each of the seven groups; averaging the bouncing-busy hours for each of the plurality of sectors for each of the seven groups as average bouncing-busy hours; selecting one or more of the bouncing-busy hours that are a percentage amount from the average bouncing-busy hour for each of the plurality of sectors for each of the seven groups as selected bouncing-busy hours; averaging the selected bouncing-busy hours for each of the plurality of sectors for each of the seven groups as new average bouncing-busy hours; selecting a maximum average bouncing-busy hour for each of the plurality of sectors; and creating an ordering of the plurality of sectors based on the maximum, average, bouncing-busy hour for each of the plurality of sectors.

The third ordering algorithm includes: determining a bouncing-busy hour for each day for each of a plurality of sectors; determining a range of the bouncing-busy hours for each of the plurality of sectors; dividing the range for each of the plurality of sectors into a number of equal segments;

counting the number of bouncing-busy hours falling within each of the equal segments for each of the plurality of sectors; choosing a number of segments for each of the plurality of sectors as chosen segments, based on the number of bouncing-busy hours falling within each of the equal segments; averaging the bouncing-busy hours falling within the chosen segments as an average bouncing-busy hour for each of the plurality of sectors, and creating an ordering of the plurality of sectors based on the average bouncing-busy hour for each of the plurality of sectors. One or more sectors requiring additional communications resources based on the ordering of sectors in each group are determined.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, many processors have memory. We recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, Random-Access Memory (RAM), Read-Only Memory (ROM), Electrically-Erasable, Programmable, Read-Only Memory (EEPROM), flash memory or other memory technology, Compact Disk, Read-Only Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile memory. Exemplary hardware devices include solid-state memory, such as RAM. Memory 116 includes computer-storage media in the form of non-volatile memory. The memory 116 may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. I/O components 120 present data indications to a user or other device. Exemplary output components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
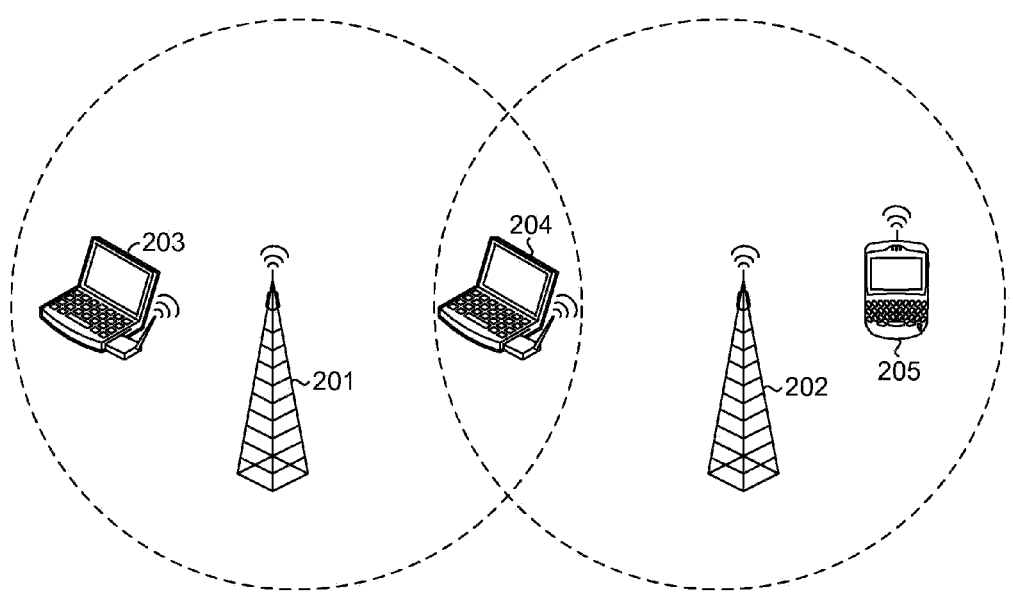
FIG. 2 depicts a block diagram of an exemplary network environment suitable for implementing an embodiment of the invention.

Turning now to FIG. 2, a diagram depicting a network environment suitable for implementing the present invention is given. Basestations 201, 202 provide access to network services by providing wireless links to mobile computing devices 203, 204, 205. Mobile computing devices 203, 204, 205 can be any computing devices such as those described with reference to FIG. 1 that include a wireless communication device. By way of example, laptops, handheld PDAs, and mobile phones can all contain wireless communications devices and act as mobile computing devices. According to an embodiment of the invention, basestations 201, 202 contain communication resources, such as modems providing the ability for mobile computing devices to connect to the network. Each basestation 201, 202 could have additional communication resources added to it, allowing the support of a larger number of mobile computing devices 203, 204, 205.

Figure 3:
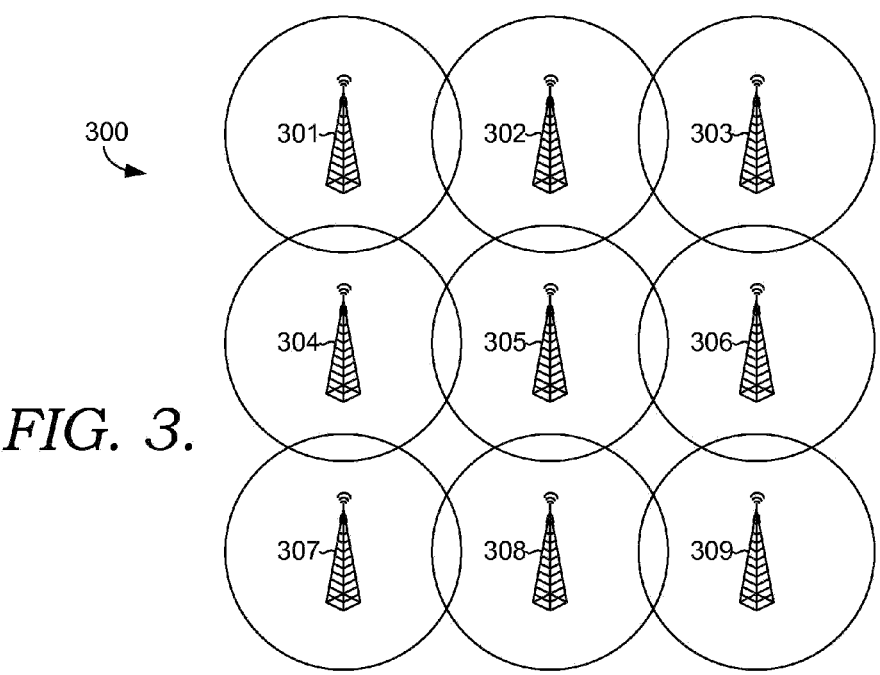
FIG. 3 depicts a block diagram of an exemplary wide-area, network environment suitable for implementing an embodiment of the invention.

Each of the basestations 201, 202 can have one or more sectors, which can be logically grouped together to form a cluster in a large-scale, wide-area network. Turning to FIG. 3, an example of a large-scale, wide-area network 300 is depicted, in accordance with an embodiment of the invention. The wide-area network 300 is divided into a number of sectors of basestations 301-309. Each basestation can have one or more sectors as discussed with reference to FIG. 2. As mobile computing devices move through the network 300, different sectors can provide access to network resources. It may be the case that traffic is not evenly distributed across all sectors. By way of example, sectors of basestations 305, 306, 308, and 309 could be located in a downtown, metropolitan area, while the remaining sectors in the network could be located in a more rural area. In this case, sectors of basestations 305, 306, 308, and 309 could experience significantly more demand for resources than the other sectors in the network 300.

According to an embodiment of the invention, resource demand within a sector may also be time-variant. Turning back to the example, sectors of basestations 305, 306, 308, and 309 may have substantial less demand than the rest of the network after business hours. The hour that is the busiest for any of the sectors in the network 300 may not be the same across sectors, or across days for the same sector. The bouncing-busy hour is the busiest hour of any day for any sector, regardless of what hour it is. The bouncing-busy hour for sectors of basestation 305, in the downtown section may be 11 am, as an example. However, the bouncing-busy hour for sectors of basestation 301, in a more rural area, may be 7 pm.

One way to design ways to model the average usage of a sector can be to base the model on bouncing-busy hour, traffic measurements, in accordance with an embodiment of the invention. By way of example, one or more average-usage modeling algorithms, based on bouncing busy hours could be used to characterize the resource demands on each sector of a network. This categorization could then be used to identify sectors requiring additional communication resources.

Figure 4:
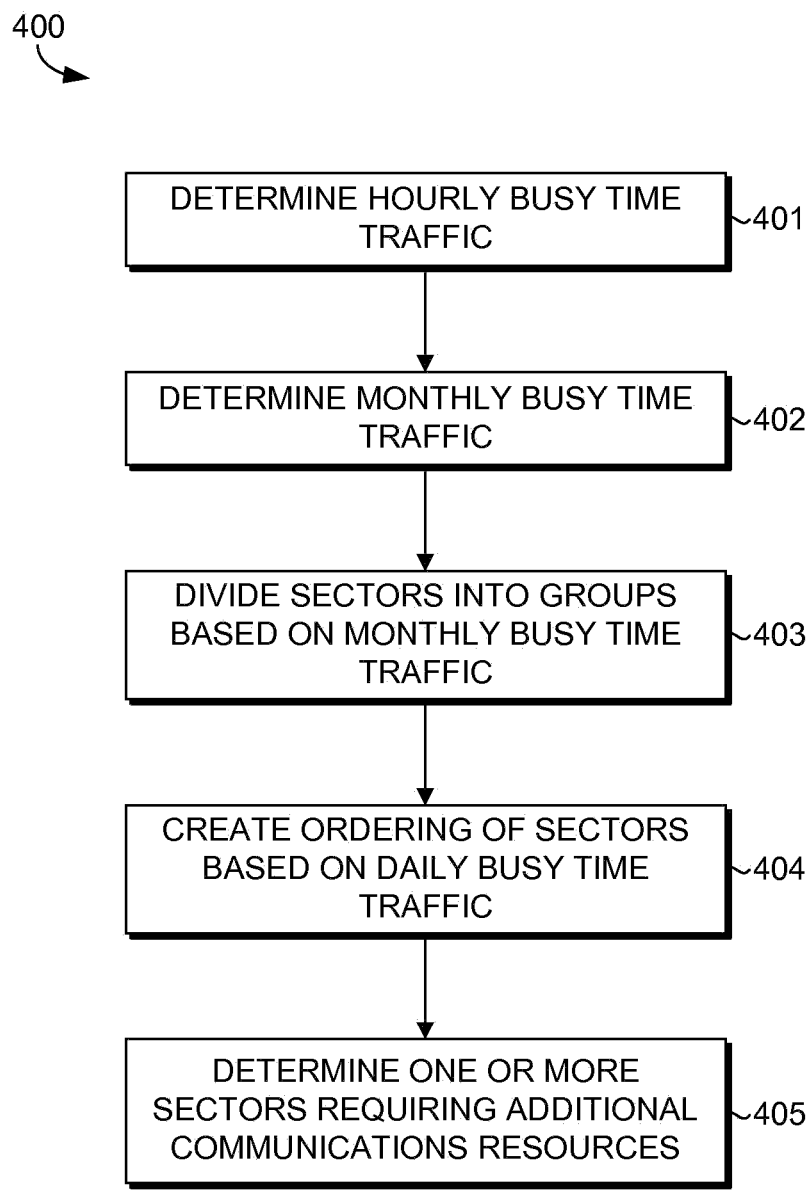
FIG. 4 is a flow diagram showing a method of determining one or more sectors requiring additional communication resources, in accordance with an aspect of the present invention.

Turning now to FIG. 4, a flow diagram depicting a method 400 of determining a number of sectors requiring additional communication resources is given. Hourly, busy-time traffic is collected, as shown at block 401 of FIG. 4. According to an embodiment of the invention, the hourly, busy-time traffic could be in Erlangs. By way of example, each basestation in each sector could store a running count of the number of Erlangs at that basestation. A central computing device, connected to the network connecting each of the basestations in all the sectors together, such as the Internet, could be used to collect the Erlang-based data from each of the basestation throughout the network. Monthly, busy-time traffic is determined, based on the collected, hourly, busy-time traffic for each of the sectors, as shown at block 402. By way of example, the monthly, busy-time traffic could be calculated as the sum of the hourly, busy-time traffic for each sector.

The sectors are divided into a number of groups, based on the monthly, busy-time traffic, as shown at block 403. In accordance with an embodiment of the invention, the sectors could be divided by first ordering them by amount of monthly, busy-time traffic and then dividing the list obtained by the ordering in thirds. Those skilled in the art will recognize that there are many ways in which the sectors could be divided into groups according to usage measurements such as monthly, busy-time traffic. Different algorithms can be used to estimate the busy-time traffic of each sector. Models used to estimate busy-time traffic have varying characteristics. By way of example, some algorithms can yield high estimates of busy-time traffic. Other algorithms could yield low estimates, given the same input data.

According to an embodiment of the invention, different algorithms can be used for each of the groups of sectors determined at block 403. By way of example, an algorithm that creates high estimates could be used for the sectors in the group with the busiest sectors. Algorithms that produce increasingly more conservative estimates could be used for groups with decreasingly busy sectors. This could result in additional resources being added more aggressively to sectors in the groups of the busiest sectors, while more conservative approaches could be taken in less busy sectors. An ordering of sectors in each group is created, based on the hourly, busy-time traffic, as shown at block 404. Those skilled in the art will recognize that there are a number of different algorithms suitable for creating such orderings.

Based on the orderings, one or more sectors requiring additional communication resources are determined, as shown at block 405. Those skilled in the art will recognize that there are many ways in which sectors could be determined based on the ordering in each group. For example, fixed numbers of sectors could be chosen from each group based on the orderings. As another example, the orderings could be normalized and combined, creating a single ordering, which could then be used to determine a number of sectors requiring additional resources. Such normalization and combination could be performed in a number of ways, including utilizing a weighting factor for each group and then linearly combining the groups to make a single ordering.

Figure 5:
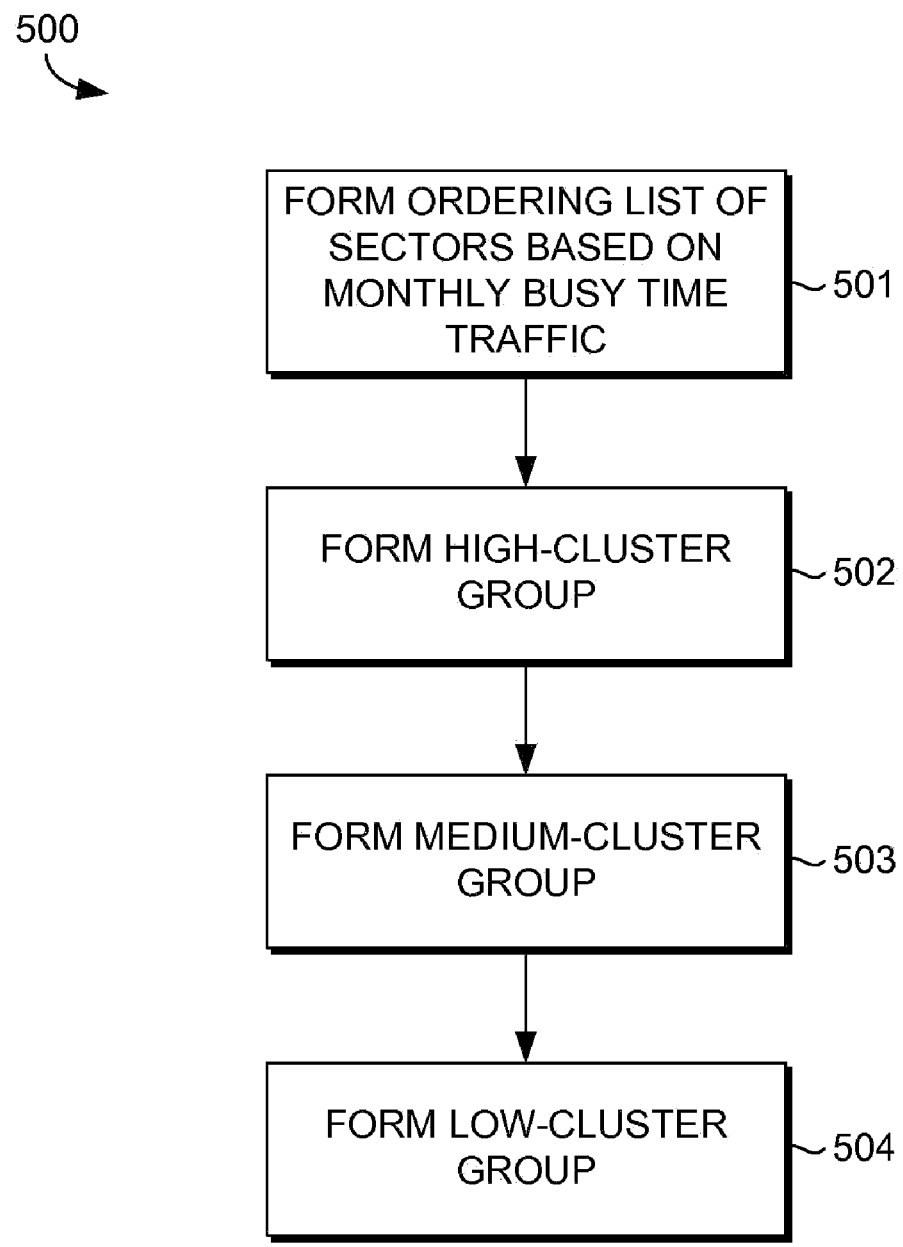
FIG. 5 is a flow diagram showing a method of dividing a number of sectors into groups, based on busy-time data, in accordance with an aspect of the present invention.

Turning now to FIG. 5, a flow diagram depicting a method 500 of dividing a number of sectors into groups is given. An ordered list of all sectors is formed based on monthly, busy-time traffic for each sector, as shown at block 501. A high-cluster group is formed from the sectors ranked in the top 30% of the list, as shown at block 502. A medium-cluster group is formed from the sectors ranked between 30% and 70%, according to the ordered list, as shown at block 503. A low-cluster group is formed from sectors ranked below 70% according to the ordered list, as shown at block 504. Those skilled in the art will recognize that there are many other ways to form groups suitable for use in the present invention. By way of example, a small percentage could be used for the high-cluster group, with each additional group being larger than the first.

Figure 6:
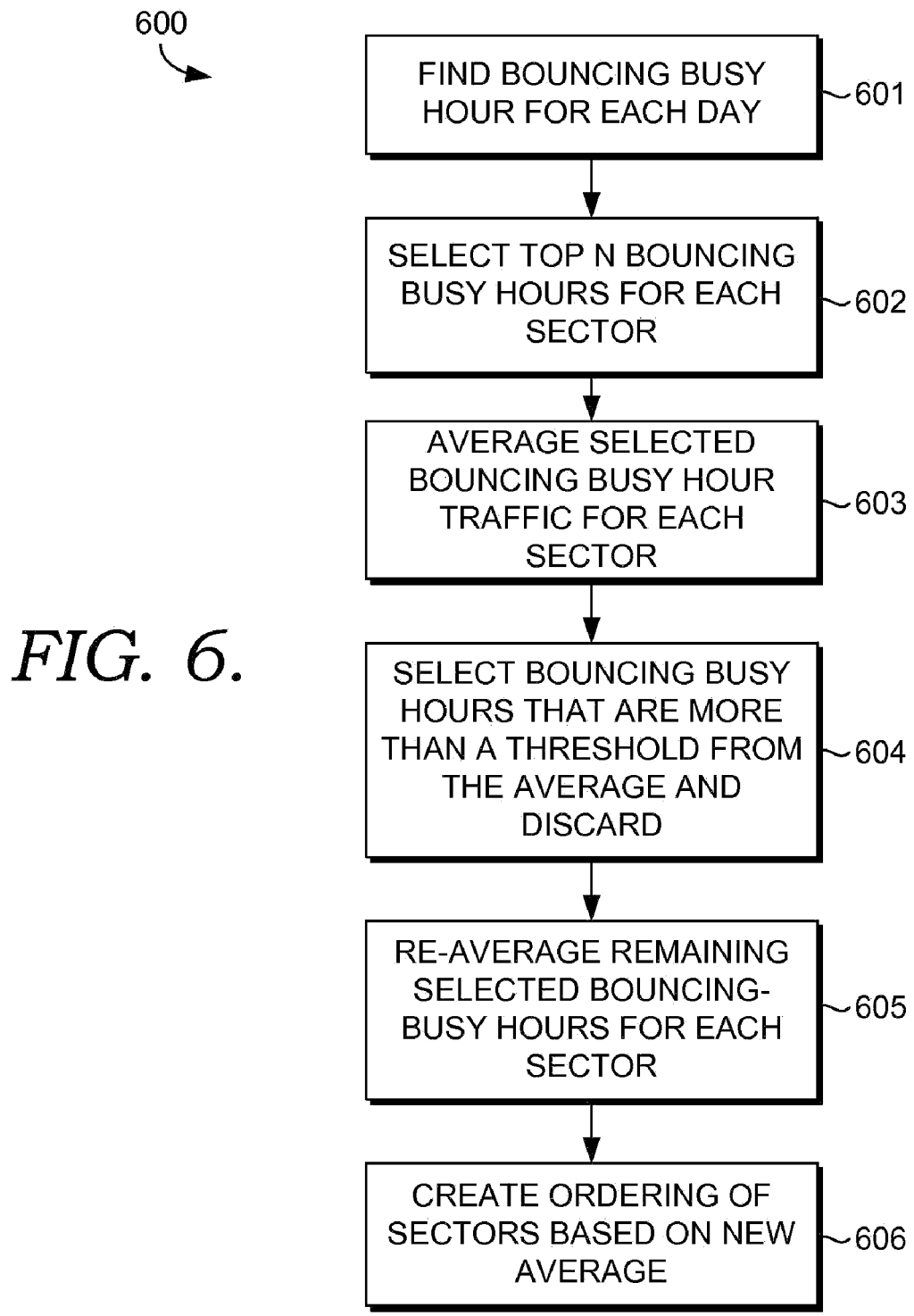
FIG. 6 is a flow diagram showing a method of creating an ordering of sectors, based on bouncing-busy time data, in accordance with an aspect of the present invention.

Turning now to FIG. 6, a flow diagram depicting a top-N-algorithm-based method 600 of creating an ordering of sectors is given. The bouncing-busy hour for each day for each sector is determined, as shown at block 601. According to an embodiment of the invention, the bouncing-busy hour in a day for a sector is the hour with the largest amount of busy-time traffic. By way of example, the bouncing-busy hour for a day for a sector could be the hour with the highest Erlang value. The top N bouncing-busy hours are selected for each sector, as shown at block 602. According to an embodiment of the invention, N could be any number between one and the number of days in the month. By way of example, the eight highest bouncing-busy hours, which could correspond to the eight days with the largest busy-time traffic for the busiest hour of each of the days, could be selected.

The N selected bouncing-busy hours are averaged for each sector, as shown at block 603. The bouncing-busy hours that are a threshold outside of the determined average bouncing-busy hour are selected and discarded from the N bouncing-busy hours, as shown at block 604. Those skilled in the art will recognize that there are many ways to set the threshold for determining outliers to be discarded in this fashion. By way of example, bouncing-busy hours that are more than one standard deviation away from the average could be discarded as outliers. As another example, bouncing-busy hours that are more than 35% away from the average could be discarded as outliers.

The remaining bouncing-busy hours of the N selected bouncing-busy hours after the outliers have been discarded are averaged, producing a new average, for each sector, as shown at block 605. An ordering of all sectors is created based on the new average bouncing-busy hours for each sector, as shown at block 606.

Figure 7:
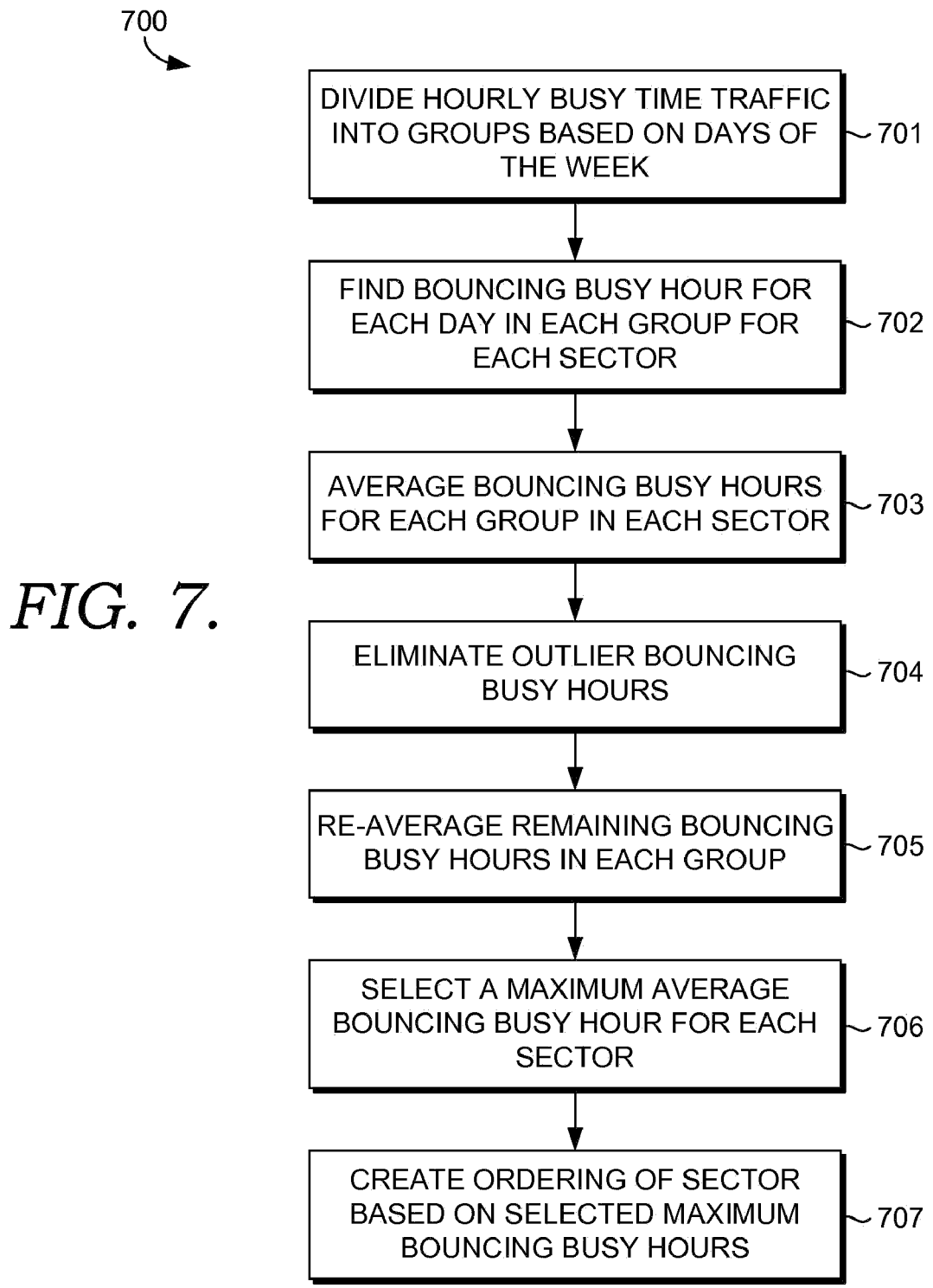
FIG. 7 is a flow diagram showing a method of creating an ordering of sectors, based on bouncing-busy time data, in accordance with an aspect of the present invention.

Turning now to FIG. 7, a flow diagram depicting a weekly-average-algorithm-based method 700 of creating an ordering of sectors is given. Hourly, busy-time traffic for each sector are divided into seven groups based on days of the week, as shown at block 701. According to an embodiment, each sector will have approximately four days in each group, representing the four of each weekday occurring in a single month. The bouncing-busy hour is determined for each day in each group for each sector, as shown at block 702. The bouncing-busy hours in each group are averaged for each sector, as shown at block 703. According to an embodiment, this results in seven average, bouncing-busy hours for each sector, one for each day of the week.

Outlier bouncing-busy hours are eliminated from each group for each sector, based on the average for each group, as shown at block 704, similar to block 604 of FIG. 6. The remaining bouncing-busy hours in each group are averaged, forming a new average for each group for each sector, as shown at block 705. According to an embodiment, this will produce seven new averages for each sector, one corresponding to each day of the week. The maximum average is selected for each sector, as shown at block 706, and an ordering is created based on the selected maximum averages for each sector, as shown at block 707.

Figure 8:
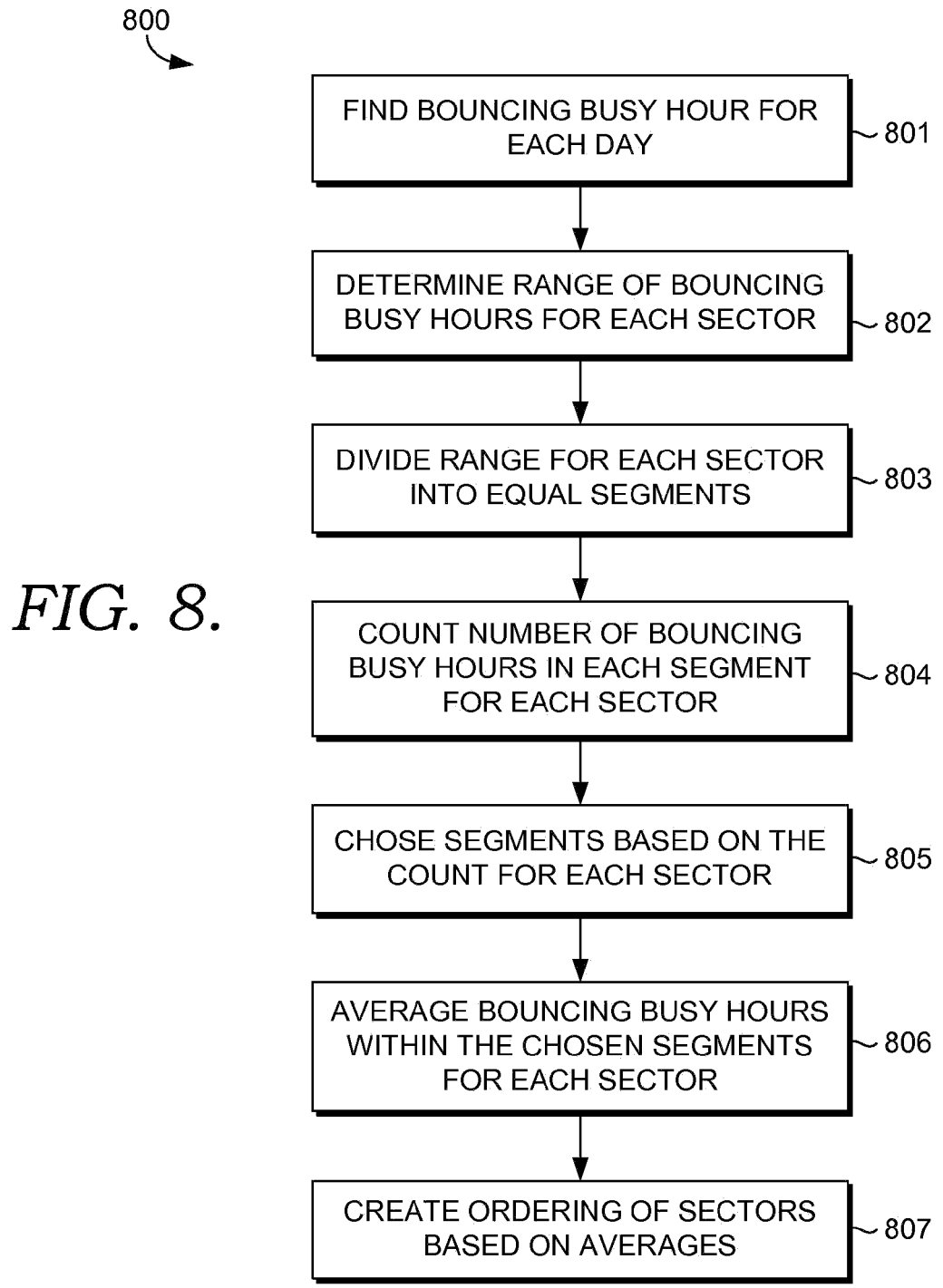
FIG. 8 is a flow diagram showing a method of creating an ordering of sectors, based on bouncing-busy time data, in accordance with an aspect of the present invention.

Turning now to FIG. 8, a flow diagram depicting a histogram-algorithm-based method 800 of creating an ordering of sectors is given. The bouncing-busy hour for each day is determined for each sector, as shown at block 801. A range of bouncing-busy hours is determined for each sector, as shown at block 802. According to an embodiment of the invention, the range of bouncing-busy hours could be determined by subtracting the largest, bouncing-busy hour from the smallest, bouncing-busy hour for each sector. Those skilled in the art will recognize that there are other ways in which a range could be determined. For example, an average bouncing-busy hour could be determined and outliers could be removed. The range could then be determined from the remaining, bouncing-busy hours.

The range is divided into a number of segments for each sector, as shown at block 803. According to an embodiment of the invention, the range is divided into four equal segments. According to a further embodiment the range could be divided into some number of unequal segments, with small segments at the top of the range, and larger segments at the bottom of the range. Those skilled in the art will recognize that there are a number of ways to divide the range into segments. The number of bouncing-busy hours falling into each segment of the range are counted, for each sector, as shown at block 804. According to an embodiment of the invention, an ordering of the segments of the range can be made based on the number of bouncing-busy hours falling into each segment in the range. Those skilled in the art will recognize there are a number of ways to produce a histogram of the bouncing-busy hours for each sector.

A number of the segments are chosen, based on the associated number of bouncing-busy hours, for each sector, as shown at block 805. According to an embodiment of the invention, the two segments with the most bouncing-busy hours are selected. The bouncing-busy hours falling within the chosen segments are averaged for each sector, as shown at block 806. According to an embodiment of the invention, the averaging could include removing outliers after the initial averaging and creating a new average with the remaining bouncing-busy hours falling within the chosen segments. An ordering of the sectors is created, based on the average, bouncing-busy hours determined for each sector, as shown at block 807.

Figure 9:
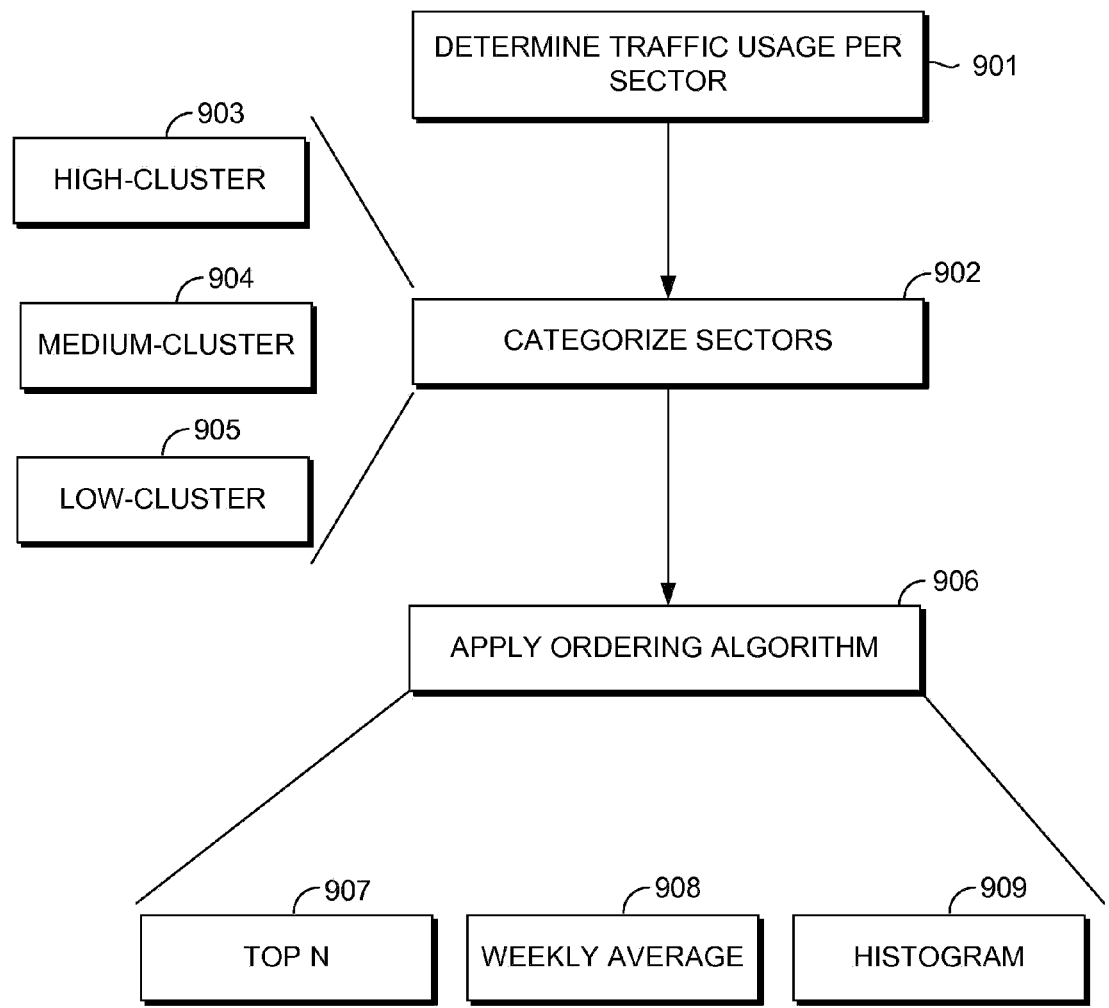
FIG. 9 depicts a block diagram of a process for creating orderings of sectors in a network of sectors, in accordance with an aspect of the present invention.

Turning now to FIG. 9, a block diagram of a process for creating orderings of sectors in a network divided into a number of sectors, based on busy-time data is given. Busy-time traffic is collected 901. There are a number of ways busy-time traffic could be collect. For example, busy-time traffic could be exported by each basestation in a sector and collected by a computing device connected to a network connecting all basestations throughout the network. The busy-time traffic could contain information about the total, busy-time traffic for an hour and identification information. The identification information could consist of many different things. For example, the identification information could include a timestamp, a basestation identifier, and a sector identifier.

The hourly, busy-time data can be used to categorize 902 each sector in the network. For example, three groups could be formed, a high-cluster group 903, a medium-cluster group 904, and a low-cluster group 905. Ordering algorithms could then be applied 906 to each group. According to an embodiment of the invention, a top-N algorithm could be applied to the high-cluster group 907, a weekly-average algorithm could be applied to the medium-cluster group 908, and a histogram algorithm could be applied to the low-cluster group 909. A further ordering algorithm could be applied to combine the three orderings into a single ordering of all sectors in the network.

Figure 10:
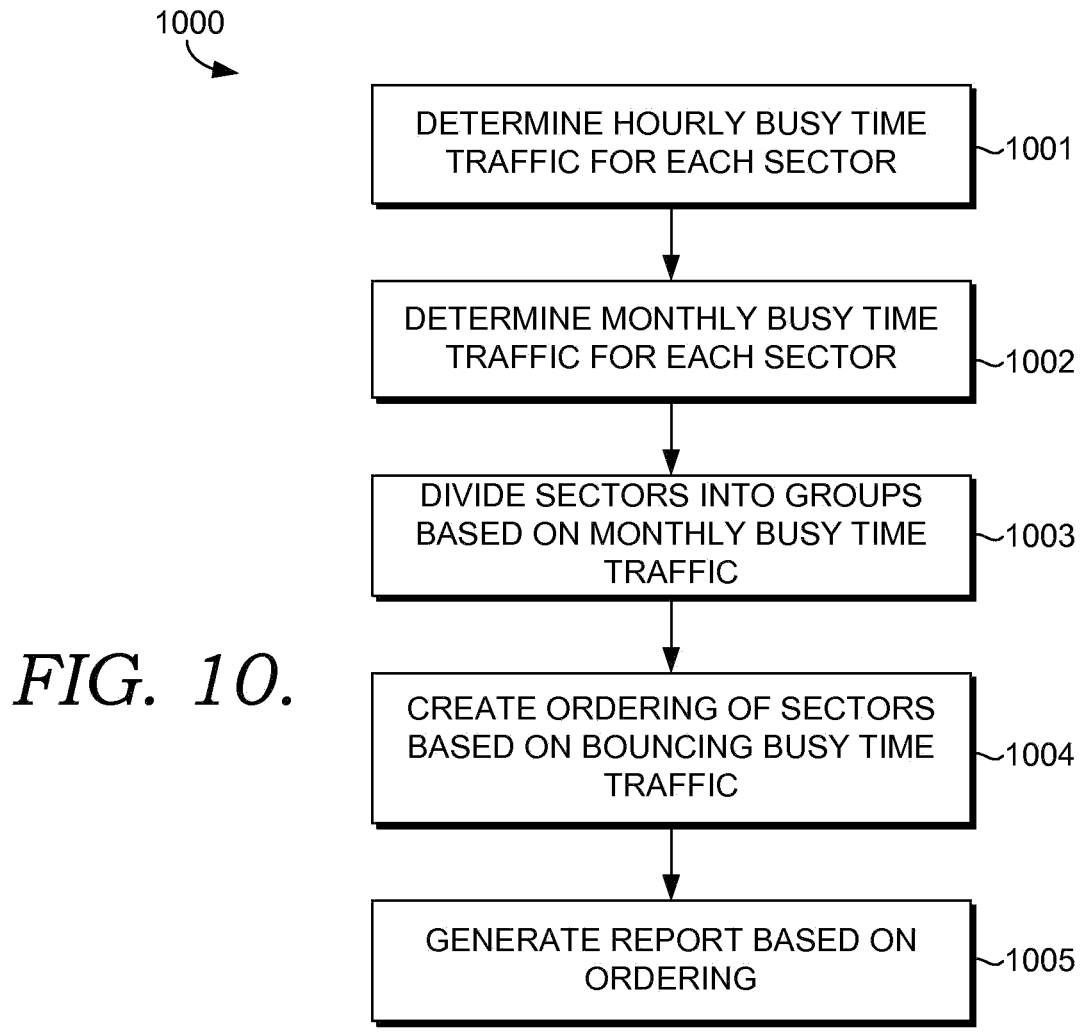
FIG. 10 is a flow diagram showing a method of generating a report indicating one or more sectors requiring additional communication resources, in accordance with an aspect of the present invention.

Turning now to FIG. 10, a flow diagram depicting a method 1000 of generating a report, identifying a number of sectors in a network of sectors requiring additional communication resources is given. Hourly, busy-time traffic is collected for each sector in the network, as shown at block 1001, similar to block 401 in FIG. 4. Monthly, busy-time traffic for each sector is determined based on the hourly, busy-time traffic, as shown at block 1002, similar to block 402 in FIG. 4. Sectors are divided into groups based on the monthly, busy-time traffic, as shown at block 1003, similar to block 403. An ordering of the sectors in each group is created based on the hourly, busy-time traffic, as shown at block 1004, similar to block 404 of FIG. 4. A report is generated, identifying a number of sectors requiring additional communication resources, as shown at block 1005. Those skilled in the art will recognize that there are a number of ways to generate a report. By way of example, a number of sectors from each group could be chosen as requiring additional communication resources based on the orderings in each group. A report could be created including the identifiers of basestations requiring additional resources and their physical locations. Those skilled in the art will recognize that there are a number of media suitable for delivering reports created.

Figure 11A:
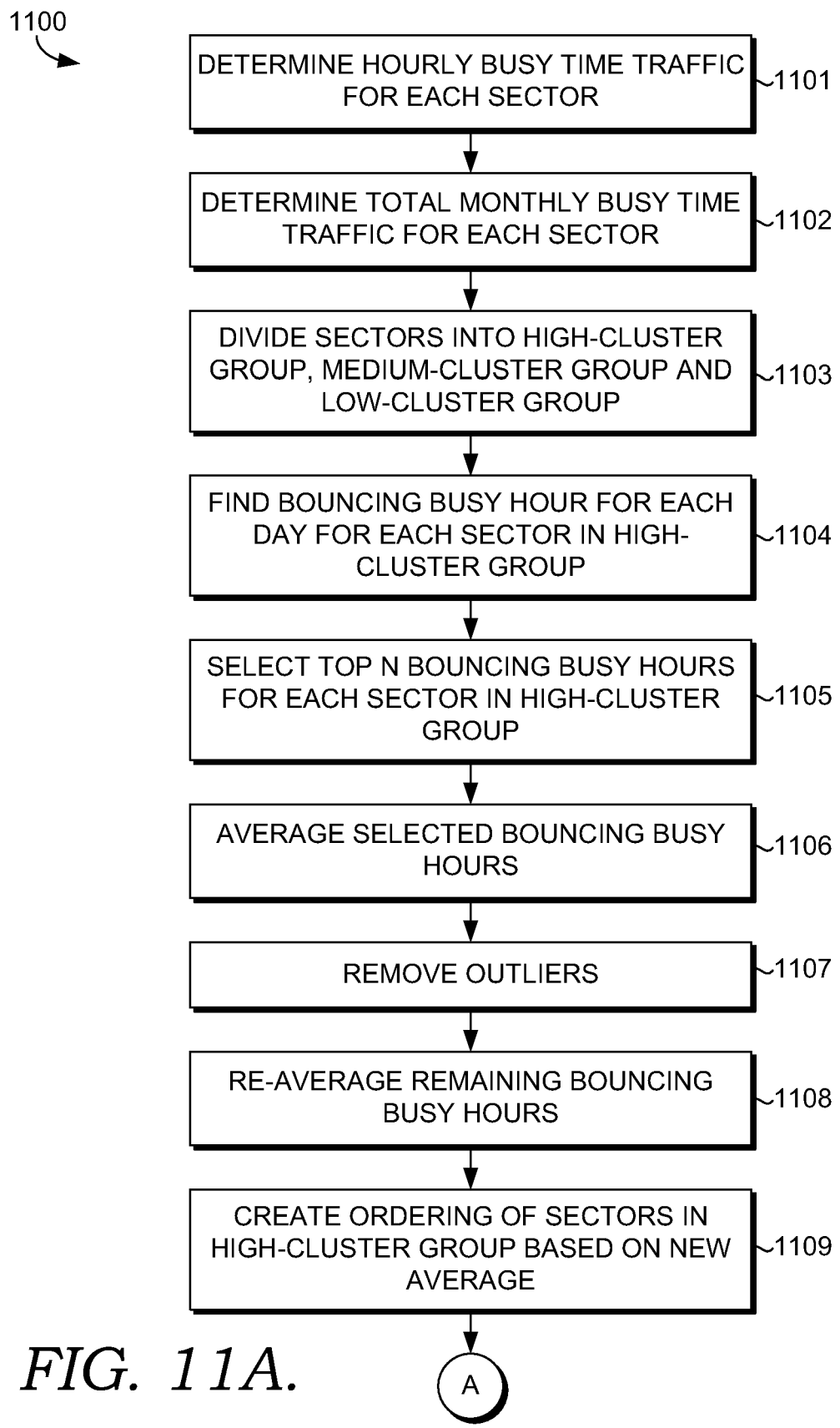
FIGS. 11A, 11B, and 11C depict a flow diagram showing a method of determining one or more sectors requiring additional communication resources, in accordance with an aspect of the present invention.
Figure 11B:
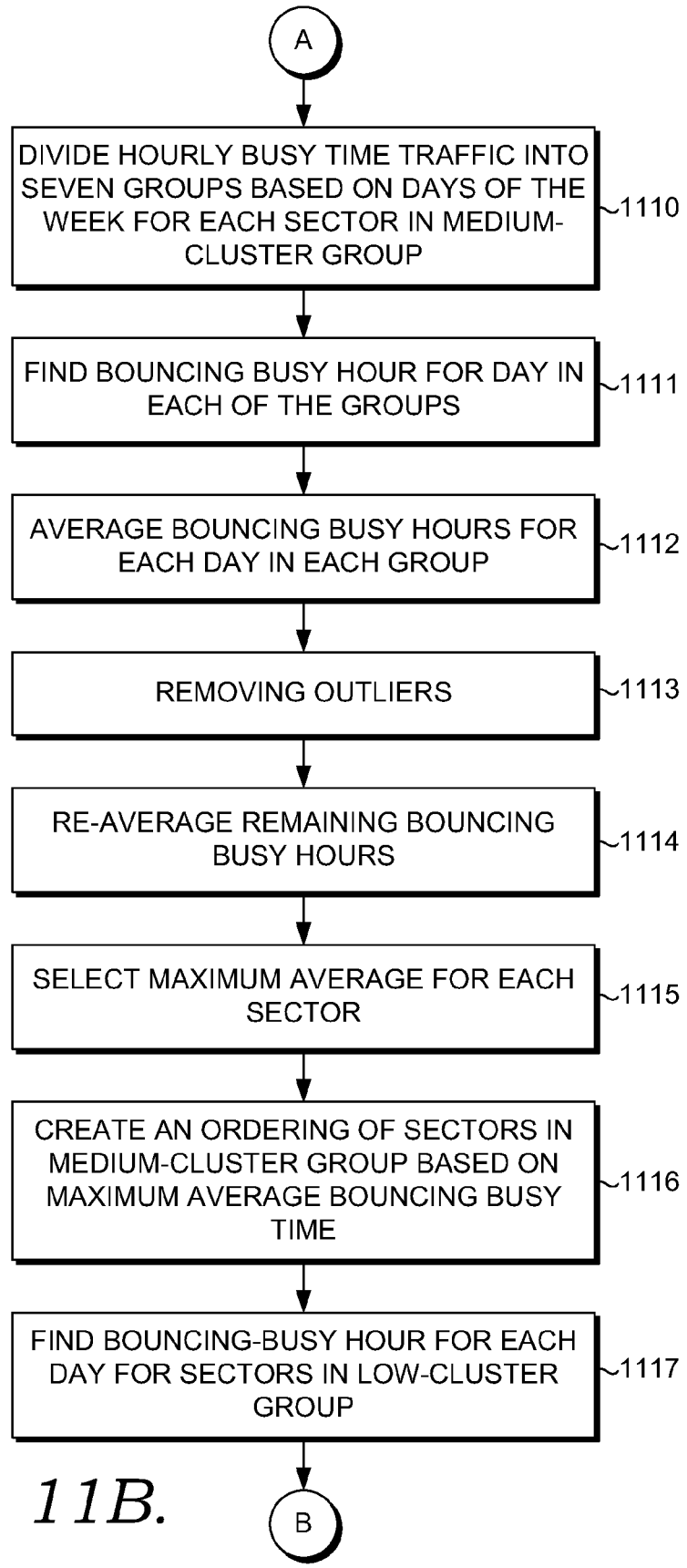
Figure 11C:
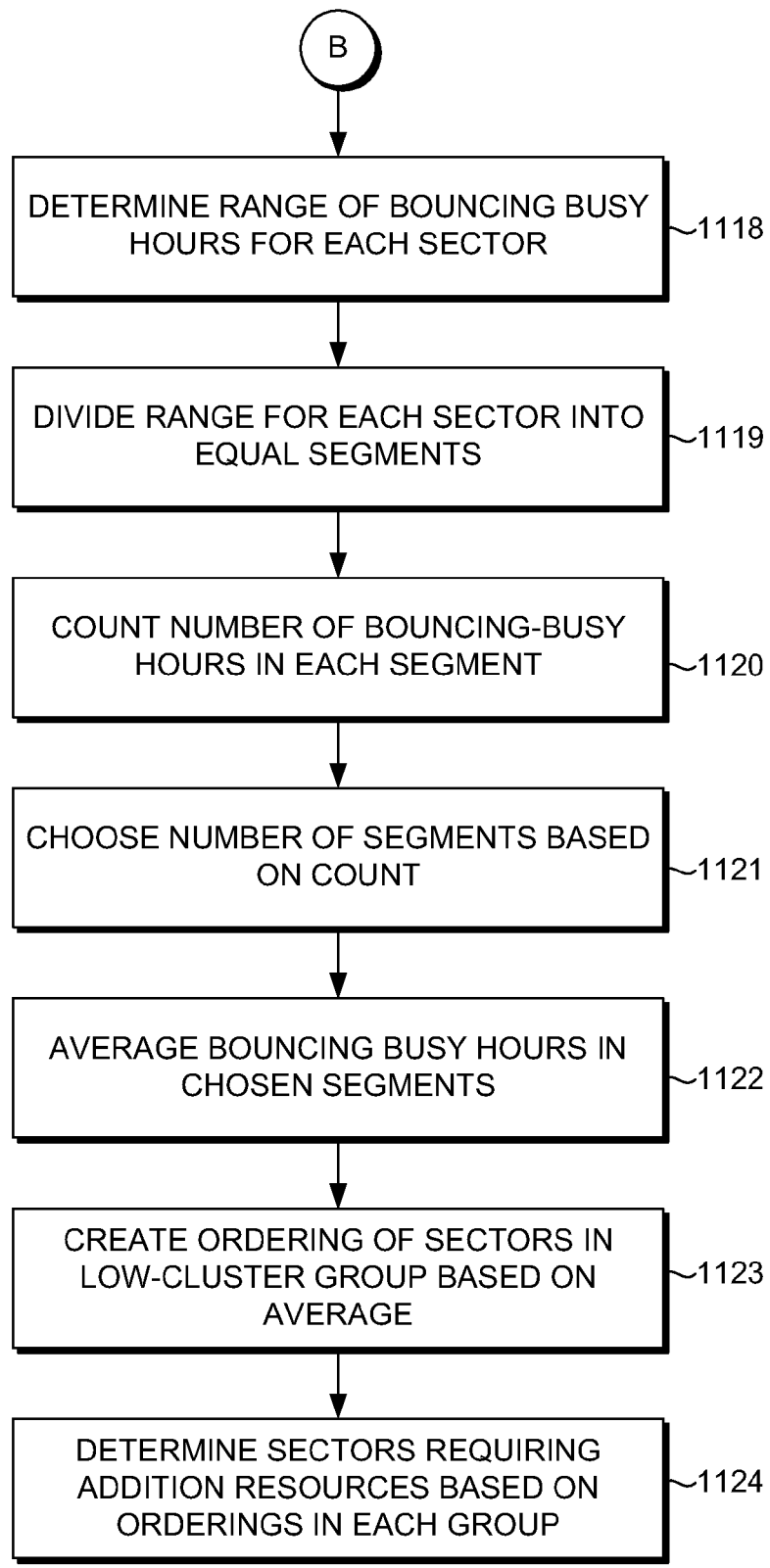

Turning now to FIGS. 11A, 11B, and 11C, a flow diagram depicting a method 1100 of determining a number of sectors, in a network divided into sectors, that require additional communication resources. Hourly, busy-time traffic is collected for each sector, as shown at block 1101, similar to block 401 in FIG. 4. Monthly, busy-time traffic is determined for each sector, as shown at block 1102, similar to block 402 in FIG. 4. The sectors are divided into high-cluster group, a medium-cluster group, and a low-cluster group, as shown at block 1103, similar to method 500 of FIG. 5.

The bouncing-busy hour for each day, for each sector in the high-cluster group is determined, as shown at block 1104, similar to block 601 of FIG. 6. The top N bouncing-busy hours for each sector in the high-cluster group are chosen, as shown at block 1105, similar to block 602 of FIG. 6. The selected bouncing-busy hours are averaged for each sector in the high-cluster group, as shown at block 1106, similar to block 603 of FIG. 6. Outliers in the selected, bouncing-busy hours are removed for each sector, as shown at block 1107, similar to block 604. The remaining selected, bouncing-busy hours are averaged, creating a new average, as shown at block 1108, similar to block 605. An ordering of the sectors in the high-cluster group is created based on the new averages, as shown at block 1109, similar to block 606 in FIG. 6.

The busy-time traffic is divided into seven groups for each sector in the medium-cluster group, as shown at block 1110, similar to block 701 in FIG. 7. A bouncing-busy hour for each day for each sector in the medium-cluster group is determined, as shown at block 1111, similar to block 702. The bouncing-busy hours in each of the seven groups for each sector in the medium-cluster group are averaged, as shown at block 1112, similar to block 703 in FIG. 7. Outliers are removed from each of the seven groups for each sector in the medium-cluster group, as shown at block 1113, and averages are calculated with the remaining bouncing-busy hours, as shown at block 1114, similar to block 704 and block 705 of FIG. 7. The maximum, average bouncing-busy hour is selected for each sector in the medium-cluster group, as shown at block 1115, similar to block 706 of FIG. 7. An ordering of the sectors in the medium-cluster group is created based on the maximum averages, as shown at block 1116, similar to block 707 of FIG. 7.

The bouncing-busy hour for each sector in the low-cluster group is determined, as shown as block 1117, similar to block 801 of FIG. 8. A range of bouncing-busy hours is determined for each sector in the low-cluster group, as shown at block 1118, and each range is divided into a number of segments, as shown at block 1119, similar to block 802 and block 803 of FIG. 8. The number of bouncing-busy hours in each segment are counted, as shown at block 1120, similar to block 804. A number of segments are chosen, based on the number of bouncing-busy hours falling within each segment, as shown at block 1121, and an average of the bouncing-busy hours in the chosen segments for each sector in the low-cluster group is determined, as shown at block 1122, similar to block 805 and block 806 of FIG. 8. An ordering of the sectors in the low-cluster group is created based on the averages, as shown at block 1123, similar to block 807 of FIG. 8. Sectors requiring additional communication resources are determined based on the orderings created in each of the three groups, as shown at block 1124, similar to block 405 of FIG. 4.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media storing instructions executable by a computing device for performing a method of determining one or more sectors requiring additional communications resources in a network divided into a plurality of sectors, the method comprising:
  by way of a processor of said computing device, determining usage data within each sector, wherein the usage data includes a total-hourly, busy-time traffic for each hour for each of the plurality of sectors;
  dividing the plurality of sectors into groups based on the usage data for each sector;
  creating an ordering of sectors in each group based on average usage data of the sectors;
  determining one or more sectors requiring additional resources based on the ordering of sectors in each group; and
  facilitating allocation of said additional communications resources consistent with said ordering.

2. The media of claim 1, wherein the groups comprise:
  a high-cluster group;
  a medium-cluster group; and
  a low-cluster group.

3. The media of claim 2, wherein dividing the plurality of sectors into groups comprises:
  forming an ordered list of the plurality of sectors based on the total-monthly, busy-time traffic, wherein the sector with the largest total-monthly, busy-time traffic is at the top of the list;
  forming the high-cluster group from the sectors ranked in about the top 30% according to the ordered list of the plurality of sectors;
  forming the medium-cluster group from the sectors ranked between about 30% and 70% according to the ordered list of the plurality of sectors; and
  forming the low-cluster group from the sectors ranked in the about bottom 30% according to the ordered list of the plurality of sectors.

4. The media of claim 2, wherein a first ordering algorithm of the set of ordering algorithms facilitates a first process that includes:
  determining a bouncing-busy hour for each day for each of a plurality of sectors;
  selecting a top number of bouncing-busy hours for each of the plurality of sectors as selected bouncing-busy hours for each of the plurality of sectors;
  averaging the selected bouncing-busy hours for each of the plurality of sectors as average bouncing-busy hours;
  selecting one or more of the selected bouncing-busy hours that are a threshold amount from the average bouncing-busy hour for each of the plurality of sectors as new selected bouncing-busy hours for each of the plurality of sectors;
  averaging the new selected bouncing-busy hours for each of the plurality of sectors as new average bouncing-busy hours; and
  creating an ordering of the plurality of sectors based on the new average bouncing-busy hour for each of the plurality of sectors.

5. The media of claim 4, wherein the threshold amount from the average bouncing-busy hour is about 35%.

6. The media of claim 4, wherein a second of the set of ordering algorithms facilitates a first process that includes:
  dividing the total-hourly, busy-time traffic for each sector into seven groups according to days of the week;
  determining a bouncing-busy hour for each day for each of a plurality of sectors for each of the seven groups;
  averaging the bouncing-busy hours for each of the plurality of sectors for each of the seven groups as average bouncing-busy hours;
  selecting one or more of the bouncing-busy hours that are a percentage amount from the average bouncing-busy hour for each of the plurality of sectors for each of the seven groups as selected bouncing-busy hours;
  averaging the selected bouncing-busy hours for each of the plurality of sectors for each of the seven groups as new average bouncing-busy hours;
  selecting a maximum average bouncing-busy hour for each of the plurality of sectors; and
  creating an ordering of the plurality of sectors based on the maximum average bouncing-busy hour for each of the plurality of sectors.

7. The media of claim 6, wherein the percentage is 35%.

8. The media of claim 6, wherein a third of the set of ordering algorithms facilitates a first process that includes:
  determining a bouncing-busy hour for each day for each of a plurality of sectors;
  determining a range of the bouncing-busy hours for each of the plurality of sectors;
  dividing the range for each of the plurality of sectors into a number of equal segments;

counting the number of bouncing-busy hours falling within each of the equal segments for each of the plurality of sectors;

choosing a number of segments for each of the plurality of sectors as chosen segments, based on the number of bouncing-busy hours falling within each of the equal segments;

averaging the bouncing-busy hours falling within the chosen segments as an average bouncing-busy hour for each of the plurality of sectors; and creating an ordering of the plurality of sectors based on the average bouncing-busy hour for each of the plurality of sectors.

9. The media of claim 8, wherein determining the range of the bouncing-busy hours comprises:
determining a maximum bouncing-busy hour;
determining a minimum bouncing-busy hour; and
determining the range by subtracting the minimum bouncing-busy hour from the maximum bouncing-busy hour.

10. The media of claim 8, wherein the number of equal segments is four.

11. The media of claim 9, wherein the creating an ordering of sectors in each of the plurality of groups further comprises:
a high-cluster group;
a medium-cluster group; and
a low-cluster group;
utilizing the first of the set of ordering algorithms for the high-cluster group;
utilizing the second of the set of ordering algorithms for the medium-cluster group; and
utilizing the third of the set of ordering algorithms for the low-cluster group.

12. One or more non-transitory computer-readable media storing computer-executable instructions executable by a computing device for performing a method of generating a report containing an ordering of a plurality of sectors in a network divided into sectors, the method comprising:
by way of a processor of said computing device, determining usage data within each sector, wherein the usage data includes a total-hourly, busy-time traffic for each hour for each of the plurality of sectors;
dividing the plurality of sectors into three groups based on the usage data for each sector;
creating an ordering of sectors in each of the three groups, based on the usage data, by utilizing a different ordering algorithm from a set of ordering algorithms for each of the three groups; and
generating a report containing the ordering of sectors in each of the three groups.

13. The media of claim 12, wherein the dividing the plurality of sectors into three groups based on the usage data for each sector comprises:
forming an ordered list of the plurality of sectors based on a total-monthly, busy-time traffic, wherein the sector with the largest total-monthly, busy-time traffic is at the top of the list;
forming a high-cluster group from the sectors ranked in the top 30% according to the ordered list of the plurality of sectors;
forming a medium-cluster group from the sectors ranked between 30% and 70% according to the ordered list of the plurality of sectors; and
forming a low-cluster group from the sectors ranked in the bottom 30% according to the ordered list of the plurality of sectors.

14. The media of claim 12, wherein a first of the set of ordering algorithms facilitates a first process that includes:

determining a bouncing-busy hour for each day for each of the plurality of sectors;
selecting a top number of bouncing-busy hours for each of the plurality of sectors as selected bouncing-busy hours for each of the plurality of sectors;
averaging the selected bouncing-busy hours for each of the plurality of sectors as average bouncing-busy hours;
selecting one or more of the selected bouncing-busy hours that are a threshold amount from the average bouncing-busy hour for each of the plurality of sectors as new selected bouncing-busy hours for each of the plurality of sectors;
averaging the new selected bouncing-busy hours for each of the plurality of sectors as new average bouncing-busy hours; and
creating an ordering of the plurality of sectors based on the new average bouncing-busy hour for each of the plurality of sectors.

15. The media of claim 14, wherein a second of the set of ordering algorithms facilitates a first process that includes:
determining the total-hourly, busy-time traffic for each hour for each of the plurality of sectors for one month;
dividing the total-hourly, busy-time traffic for each sector into seven groups according to days of the week;
determining a bouncing-busy hour for each day for each of a plurality of sectors for each of the seven groups;
averaging the bouncing-busy hours for each of the plurality of sectors for each of the seven groups as average bouncing-busy hours;
selecting one or more of the bouncing-busy hours that are a percentage amount from the average bouncing-busy hour for each of the plurality of sectors for each of the seven groups as selected bouncing-busy hours;
averaging the selected bouncing-busy hours for each of the plurality of sectors for each of the seven groups as new average bouncing-busy hours;
selecting a maximum average bouncing-busy hour for each of the plurality of sectors; and
creating an ordering of the plurality of sectors based on the maximum average bouncing-busy hour for each of the plurality of sectors.

16. The media of claim 15, wherein a third of the set of ordering algorithms facilitates a first process that includes:
determining a bouncing-busy hour for each day for each of a plurality of sectors;
determining a range of the bouncing-busy hours for each of the plurality of sectors;
dividing the range for each of the plurality of sectors into a number of equal segments;
counting the number of bouncing-busy hours falling within each of the equal segments for each of the plurality of sectors;
choosing a number of segments for each of the plurality of sectors as chosen segments, based on the number of bouncing-busy hours falling within each of the equal segments;
averaging the bouncing-busy hours falling within the chosen segments as an average bouncing-busy hour for each of the plurality of sectors; and
creating an ordering of the plurality of sectors based on the average bouncing-busy hour for each of the plurality of sectors.

17. One or more non-transitory computer-readable media storing computer-executable instructions executable by a computing device for performing a method of determining one or more sectors requiring additional communications resources in a network divided into a plurality of sectors, the method comprising:

by way of a processor of said computing device, determining usage data within each sector, wherein the usage data includes a total-hourly, busy-time traffic for each hour for each of the plurality of sectors;

dividing the plurality of sectors into a high-cluster group, a medium-cluster group, and a low-cluster group, based on the usage data for each sector;

creating an ordering of sectors in each of the groups, based on the usage data, by utilizing a first ordering algorithm for the high-cluster group, a second ordering algorithm for the medium-cluster group, and a third ordering algorithm for the low-cluster group; and determining the one or more sectors requiring additional communications resources based on the ordering of sectors in each group.

18. The media of claim 17, wherein the total-hourly, busy-time traffic for each of the plurality of sectors is in Erlangs.

\* \* \* \* \*